(12) United States Patent
Spitaels et al.

(10) Patent No.: US 8,639,953 B2
(45) Date of Patent: Jan. 28, 2014

(54) SYSTEM AND METHOD FOR GATHERING INFORMATION USING A POWER DEVICE WHEREIN INFORMATION IS ASSOCIATED WITH AT LEAST ONE EXTERNAL LOAD

(75) Inventors: James S. Spitaels, Shrewsbury, MA (US); Vishwas Mohaniraj Deokar, Acton, MA (US); Kyle Brookshire, Belmont, MA (US); Fred William Rodenhiser, Wilmington, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 852 days.

(21) Appl. No.: 12/412,883

(22) Filed: Mar. 27, 2009

(65) Prior Publication Data

US 2010/0250160 A1 Sep. 30, 2010

(51) Int. Cl.
*G06F 3/00* (2006.01)
*G05B 15/02* (2006.01)
*G01R 21/00* (2006.01)
*G06F 19/00* (2011.01)

(52) U.S. Cl.
USPC ........ 713/300; 710/8; 710/9; 710/10; 710/15; 710/16; 710/17; 710/18; 710/19; 713/340; 307/64

(58) Field of Classification Search
USPC .................. 710/8–10, 15–19; 713/300, 340
See application file for complete search history.

(56) References Cited

U.S. PATENT DOCUMENTS

| | | | |
|---|---|---|---|
| 4,217,645 A | 8/1980 | Barry et al. | |
| 4,394,741 A | 7/1983 | Lowndes | |
| 4,564,767 A | 1/1986 | Charych | |
| 4,611,289 A * | 9/1986 | Coppola | 713/300 |
| 4,692,632 A | 9/1987 | Gaul et al. | |
| 4,782,241 A | 11/1988 | Baker et al. | |
| 5,019,717 A | 5/1991 | McCurry et al. | |
| 5,126,585 A | 6/1992 | Boys | |
| 5,170,124 A | 12/1992 | Blair et al. | |
| 5,184,025 A | 2/1993 | McCurry et al. | |
| 5,291,383 A | 3/1994 | Oughton | |
| 5,315,533 A | 5/1994 | Stich et al. | |
| 5,319,571 A | 6/1994 | Langer et al. | |
| 5,321,626 A | 6/1994 | Palladino | |
| 5,321,627 A | 6/1994 | Reher | |
| 5,325,041 A | 6/1994 | Briggs | |
| 5,381,554 A | 1/1995 | Langer et al. | |
| 5,455,499 A | 10/1995 | Uskali et al. | |
| 5,458,991 A | 10/1995 | Severinsky | |
| 5,579,197 A | 11/1996 | Mengelt et al. | |
| 5,602,462 A | 2/1997 | Stich et al. | |
| 5,664,202 A | 9/1997 | Chen et al. | |
| 5,666,040 A | 9/1997 | Bourbeau | |
| 5,793,627 A | 8/1998 | Caldes et al. | |
| 5,886,890 A | 3/1999 | Ishida et al. | |
| 5,917,719 A * | 6/1999 | Hoffman et al. | 363/84 |
| 5,923,099 A | 7/1999 | Bilir | |
| 6,031,354 A | 2/2000 | Wiley et al. | |
| 6,170,007 B1 | 1/2001 | Venkatraman et al. | |

(Continued)

*Primary Examiner* — Tammara Peyton (74) *Attorney, Agent, or Firm* — Lando & Anastasi, LLP (57) ABSTRACT

A power device, such as a UPS, and a method for gathering system information using the power device are provided. In one aspect, a UPS receives system information associated with at least one other device, the system information including configuration management information, stores, in data storage, the system information associated with the at least one other device and provides the system information to an external entity.

32 Claims, 8 Drawing Sheets

(56) References Cited

U.S. PATENT DOCUMENTS

| | | | |
|---|---|---|---|
| 6,175,511 B1 | 1/2001 | Ooba | |
| 6,184,593 B1 | 2/2001 | Jungreis | |
| 6,201,319 B1 | 3/2001 | Simonelli et al. | |
| 6,201,371 B1 | 3/2001 | Kawabe et al. | |
| 6,204,574 B1 | 3/2001 | Chi | |
| 6,268,711 B1 | 7/2001 | Bearfield | |
| 6,274,950 B1 | 8/2001 | Gottlieb et al. | |
| 6,285,178 B1 | 9/2001 | Ball et al. | |
| 6,301,674 B1 | 10/2001 | Saito et al. | |
| 6,329,792 B1 | 12/2001 | Dunn et al. | |
| 6,433,444 B1 | 8/2002 | de Vries | |
| 6,465,910 B2 | 10/2002 | Young et al. | |
| 6,469,471 B1 | 10/2002 | Anbuky et al. | |
| 6,493,243 B1 | 12/2002 | Real | |
| 6,549,014 B1 | 4/2003 | Kutkut et al. | |
| 6,584,329 B1 | 6/2003 | Wendelrup et al. | |
| 6,601,181 B1 * | 7/2003 | Thomas | 713/340 |
| 6,700,351 B2 | 3/2004 | Blair et al. | |
| 6,784,641 B2 | 8/2004 | Sakai et al. | |
| 6,795,322 B2 | 9/2004 | Aihara et al. | |
| 6,854,065 B2 | 2/2005 | Smith et al. | |
| 6,894,622 B2 | 5/2005 | Germagian et al. | |
| 6,922,347 B2 | 7/2005 | Lanni | |
| 6,923,676 B2 | 8/2005 | Perry | |
| 6,983,212 B2 | 1/2006 | Burns | |
| 7,015,599 B2 | 3/2006 | Gull et al. | |
| 7,045,914 B2 * | 5/2006 | Liu et al. | 307/64 |
| 7,050,312 B2 | 5/2006 | Tracy et al. | |
| 7,057,308 B2 | 6/2006 | Stranberg et al. | |
| 7,082,541 B2 | 7/2006 | Hammond et al. | |
| 7,132,833 B2 | 11/2006 | Layden et al. | |
| 7,141,891 B2 | 11/2006 | McNally et al. | |
| 7,142,950 B2 | 11/2006 | Rasmussen et al. | |
| 7,202,576 B1 | 4/2007 | Dechene et al. | |
| 7,242,111 B2 | 7/2007 | Menas et al. | |
| 7,259,477 B2 | 8/2007 | Klikic et al. | |
| 7,274,112 B2 | 9/2007 | Hjort et al. | |
| 7,301,249 B2 | 11/2007 | Stranberg et al. | |
| 7,330,990 B2 * | 2/2008 | Sato et al. | 713/340 |
| 7,352,083 B2 | 4/2008 | Nielsen et al. | |
| 7,402,921 B2 | 7/2008 | Ingemi et al. | |
| 7,432,615 B2 | 10/2008 | Hjort | |
| 7,446,433 B2 | 11/2008 | Masciarelli et al. | |
| 7,456,518 B2 | 11/2008 | Hjort et al. | |
| 7,521,823 B2 | 4/2009 | Klikic et al. | |
| 7,608,944 B2 | 10/2009 | Stranberg et al. | |
| 7,615,890 B2 | 11/2009 | Masciarelli et al. | |
| 7,615,891 B2 | 11/2009 | Wu et al. | |
| 7,913,246 B2 * | 3/2011 | Hammond et al. | 717/173 |
| 8,093,755 B2 * | 1/2012 | Wang | 307/64 |
| 2001/0005894 A1 | 6/2001 | Fukui | |
| 2001/0033502 A1 | 10/2001 | Blair et al. | |
| 2001/0034735 A1 | 10/2001 | Sugiyama | |
| 2002/0130556 A1 | 9/2002 | Hohri | |
| 2002/0136042 A1 | 9/2002 | Layden et al. | |
| 2002/0136939 A1 | 9/2002 | Grieve et al. | |
| 2002/0138785 A1 | 9/2002 | Hammond et al. | |
| 2003/0033550 A1 | 2/2003 | Kuiawa | |
| 2003/0048006 A1 | 3/2003 | Shelter, Jr. et al. | |
| 2003/0062775 A1 | 4/2003 | Sinha | |
| 2003/0076696 A1 | 4/2003 | Tsai | |
| 2003/0114963 A1 | 6/2003 | Walker | |
| 2004/0036361 A1 | 2/2004 | Dai et al. | |
| 2004/0104706 A1 | 6/2004 | Ooi et al. | |
| 2005/0029984 A1 | 2/2005 | Cheng et al. | |
| 2005/0071093 A1 | 3/2005 | Stefan | |
| 2005/0071699 A1 | 3/2005 | Hammond et al. | |
| 2005/0162129 A1 | 7/2005 | Mutabdzija et al. | |
| 2005/0201127 A1 | 9/2005 | Tracy et al. | |
| 2005/0227519 A1 | 10/2005 | Perry | |
| 2006/0192436 A1 | 8/2006 | Stranberg et al. | |
| 2006/0238941 A1 | 10/2006 | Ingemi et al. | |
| 2007/0055409 A1 | 3/2007 | Rasmussen et al. | |
| 2007/0064363 A1 | 3/2007 | Nielsen et al. | |
| 2007/0216229 A1 | 9/2007 | Johnson, Jr. et al. | |
| 2008/0042491 A1 | 2/2008 | Klikic et al. | |
| 2008/0157602 A1 | 7/2008 | Stranberg et al. | |
| 2009/0150818 A1 * | 6/2009 | Bakhreiba et al. | 715/771 |
| 2009/0160254 A1 | 6/2009 | Wu et al. | |
| 2009/0201703 A1 | 8/2009 | Klikic et al. | |
| 2009/0231892 A1 | 9/2009 | Klikic et al. | |
| 2009/0251002 A1 | 10/2009 | Cohen et al. | |
| 2010/0049457 A1 | 2/2010 | Mutabdzija et al. | |
| 2010/0201194 A1 | 8/2010 | Masciarelli et al. | |

* cited by examiner

SYSTEM AND METHOD FOR GATHERING INFORMATION USING A POWER DEVICE WHEREIN INFORMATION IS ASSOCIATED WITH AT LEAST ONE EXTERNAL LOAD

BACKGROUND

1. Field of the Invention

At least one example in accordance with the present invention relates generally to systems and methods for providing uninterruptible power and more specifically to control systems and methods used to gather system information using a power device, such as an uninterruptible power supply (UPS).

2. Discussion of Related Art

The use of power devices, such as UPSs, to provide regulated, uninterrupted power for sensitive and/or critical loads, such as computer systems and other data processing systems, is known. A number of different UPS products are available including those identified under the trade name SMART-UPS from American Power Conversion Corporation of West Kingston R.I. In a typical UPS, a battery is used to provide backup power for a critical load during blackout or brownout conditions. A user of a typical UPS is able to configure and control the UPS either through a computer coupled to the UPS or through a user interface of the UPS itself.

SUMMARY OF THE INVENTION

Aspects in accord with the present invention are directed toward systems and methods for configuring a power device. According to one example, a method for providing information regarding a power device and at least one other device coupled to the power device is provided. The power device has data storage and an interface. The method includes acts of receiving, by the power device, system information associated with the at least one other device, the system information including configuration management information, storing, in the data storage, the system information associated with the at least one other device and providing the system information via the interface. In the method, the act of receiving, by the power device, the system information may include an act of receiving system information via an external system interface. Additionally, the act of providing the system information may include an act of transmitting the system information via an external system interface. Moreover, the act of providing the system information may include an act of displaying the system information in a user interface. Furthermore, the act of displaying the system information may include an act of displaying the system information in an alphanumeric display.

The method may further include an act of gathering performance information associated with the at least one other device. In the method, the act of gathering the performance information associated with the at least one other device may include an act of determining power consumption information by monitoring power drawn from a power outlet of the power device and the method further comprises determining configuration management information based in least in part on the power consumption information. In addition, the method may further include an act of sending a request for the system information to the at least one other device via an external system interface. Moreover, the method may further include an act of providing system information associated with the power device.

The method may further include an act of providing system information associated with peripherals of the power device. In the method, the act of providing the system information associated with peripherals of the power device may include an act of providing information associated with at least one of an external battery and a network management card. Additionally, the act of receiving, by the power device, the system information may include an act of receiving a name of a software application executing on the at least one other device. Further, the act of receiving, by the power device, the system information may include an act of receiving a version of the software application. Moreover, the act of receiving, by the power device, the system information may include an act of receiving a version of firmware of a peripheral of the at least one other device.

In another example, a power device is provided. The power device includes a housing, an input to receive power from a power source, an output operatively coupled to the input and configured to provide power, a user interface disposed within the housing, a data storage disposed within the housing and a controller coupled to the user interface and the data storage. The controller is configured to receive system information associated with at least one other device, the system information including configuration management information, store, in the data storage, the system information and provide the system information to an external entity.

The power device may further include an external system interface and the controller may be configured to receive system information via the external system interface. In addition, the controller configured to provide the system information to the external entity may be further configured to transmit the system information via the external system interface. Additionally, the controller configured to provide the system information to the external entity may be further configured to display the system information in the user interface. Furthermore, the user interface may include an alphanumeric display and the controller may be configured to display the system information in the alphanumeric display.

In the power device, the controller may be configured to gather performance information associated with the at least one other device. In addition, the controller may be further configured to gather power consumption information by monitoring power drawn from the output and determine configuration management information based in least in part on the power consumption information. Further, the controller may be configured to send a request for the system information to the at least one other device via an external system interface. Moreover, the controller may be configured to provide system information associated with the power device. Additionally, the controller may be configured to provide system information associated with peripherals of the power device. Furthermore, the controller may be configured to provide information associated with at least one of an external battery and a network management card.

In the power device, the controller may be configured to receive configuration management information including a name of a software application executing on the at least one other device. In addition, the controller may be configured to receive a version of the software application. Furthermore, the controller may be configured to receive a version of firmware of a peripheral of the at least one other device.

According to another example, another power device is provided. The power device includes a housing, an input to receive power from a power source, an output operatively coupled to the input and configured to provide power and a mechanism for receiving system information associated with at least one other device, the system information including configuration management information.

In the power device, the mechanism for receiving the system information may include a mechanism for receiving a name of a software application executing on the at least one other device. In addition, the mechanism for receiving the system information may include a mechanism for receiving a version of the software application. Furthermore, the mechanism for receiving the system information may include a mechanism for receiving a version of firmware of a peripheral of the at least one other device.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

At least some examples in accordance with the present invention relate to systems and processes for providing improved control, monitoring and/or configuration of uninterruptible power supplies.

The aspects disclosed herein in accordance with the present invention, are not limited in their application to the details of construction and the arrangement of components set forth in the following description or illustrated in the drawings. These aspects are capable of assuming other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Figure 1:
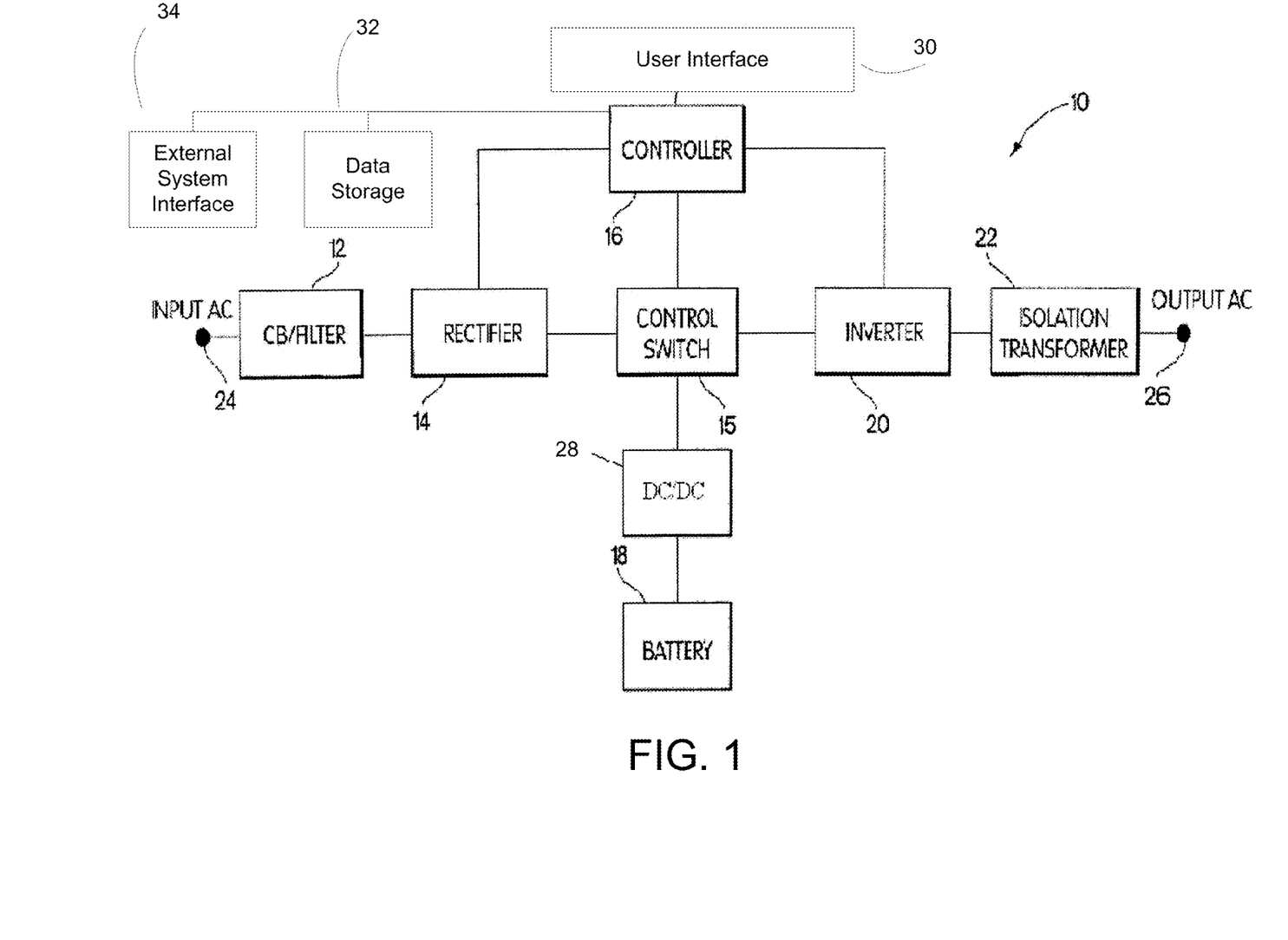
FIG. 1 is an example block diagram of a UPS in accordance with the present invention.

FIG. 1 shows an on-line UPS 10 used to provide regulated, uninterrupted power in accordance with one example in accordance with the present invention. The UPS 10 includes an input circuit breaker/filter 12, a rectifier 14, a control switch 15, a controller 16, a battery 18, an inverter 20, an isolation transformer 22, a DC/DC converter 28, a user interface (UI) 30, data storage 32 and external system interface 34. The UPS also includes an input 24 for coupling to an AC power source, and an outlet 26 for coupling to a load.

The UPS 10 operates as follows. The circuit breaker/filter 12 receives input AC power from the AC power source through the input 24, filters the input AC power and provides filtered AC power to the rectifier 14. The rectifier 14 rectifies the input voltage. The DC/DC converter 28 regulates DC power from the battery 18. The control switch 15 receives the rectified power and also receives the DC power from the DC/DC converter 28. The controller 16 determines whether the power available from the rectifier 14 is within predetermined tolerances, and if so, controls the control switch 15 to provide the power from the rectifier 14 to the inverter 20. If the power from the rectifier 14 is not within the predetermined tolerances, which may occur because of "brown out" or "black out" conditions, or due to power surges, then the controller 16 controls the control switch 15 to provide the DC power from the DC/DC Converter 28 to the inverter 20.

In an alternative example, the battery is coupled to the rectifier circuit and the rectifier functions as a boost converter on-line mode of operation and on-battery mode of operation as described in U.S. Pat. No. 7,402,921, entitled "Method and Apparatus For Providing Uninterruptible Power," issued Jul. 22, 2008, which is hereby incorporated herein by reference in its entirety.

The inverter 20 of the UPS 10 receives DC power and converts the DC power to AC power and regulates the AC power to predetermined specifications. The inverter 20 provides the regulated AC power to the isolation transformer 22. The isolation transformer 22 is used to increase or decrease the voltage of the AC power from the inverter 20 and to provide isolation between a load and the UPS 10. The isolation transformer 22 is an optional device, the use of which is dependent on UPS output power specifications. Depending on the capacity of the battery 18 and the power requirements of the load, the UPS 10 can provide power to the load during brief power source dropouts or for extended power outages.

Specific examples in accordance with the present invention include several variations of the UPS 10. For instance, in one example, the UPS 10 is configured to accept and distribute polyphase power, such as three phase power. In some examples, the outlet 26 includes a plurality of physical outlet groups, each of which includes a plurality of physical outlets. In other examples, the UPS 10 is configured to monitor and record, in data storage 32, the amount of power supplied via these outlet groups and outlets.

Returning to the example of FIG. 1, the controller 16 monitors and controls operation of the UPS 10. Using data stored in associated memory, the controller 16 also performs one or more instructions that may result in manipulated data. In some examples, the controller 16 may include one or more processors or other types of controllers. In one example, the controller 16 is a commercially available, general purpose processor. In another example, the controller 16 performs a portion of the functions disclosed herein on a general purpose processor and performs another portion using an application-specific integrated circuit (ASIC) tailored to perform particular operations. As illustrated by these examples, examples in accordance with the present invention may perform the operations described herein using many specific combinations of hardware and software and the invention is not limited to any particular combination of hardware and software components.

The data storage 32 stores computer readable information required for the operation of the UPS 10. This information may include, among other information, data subject to manipulation by the controller 16 and instructions that are executable by the controller 16 to manipulate data. Thus, in some embodiments, the data storage 32 can receive and store or retrieve and provide this computer readable information. The data storage 32 may include relatively high performance, volatile, random access memory such as a dynamic random access memory (DRAM) or static memory (SRAM) or may include a nonvolatile storage medium such as read-only memory (ROM), magnetic disk, flash memory, CD, DVD or one or more electrical switches, such as a dip switch. In one example, the data storage 32 includes both volatile and non-volatile storage. Various examples in accordance with the present invention can organize the data storage 32 into particularized and, in some cases, unique structures to perform the aspects and functions disclosed herein. In addition, these data structures may be specifically configured to conserve storage space or increase data exchange performance.

In one example, the data storage 32 includes data structures that house system information regarding the UPS 10 and devices coupled to it. Examples of system information are discussed below and include, among other information, configuration management information and performance information. The devices that may be coupled to the UPS 10 include any electronic device that requires power to function, such as, among others, computers, printers, routers, switches, automatic transfer switches and air conditioning units. Some devices may also include communication components, such as Ethernet or USB interfaces, that can be coupled to the UPS 10 via external system interface 34 to allow for enhanced communication between the device and the UPS 10.

Configuration management information may be any information that can be used to identify attributes of the UPS 10 or other devices. Examples of configuration management information specific to a device include, among other information, manufacturer, model, serial number and version. In addition, configuration management information may also include manufacturer, model, serial number and version information for components included in the device, such as software installed on the device or identifiable hardware elements within the device.

Performance information may be any information that characterizes the operation of the UPS 10 or other devices. Examples of performance information include, among other information, device uptime information, operational logs and power consumption information. Power consumption information may include listed, i.e. nameplate, values and actual measured values for power consumption of the device.

The external system interface 34 exchanges data with one or more external devices. These external devices may include any device configured to communicate using standards and protocols supported by the UPS 10. Examples of specific standards and protocols that the external system interface 34 may support include parallel, serial, and USB interfaces. Other examples of these supported protocols and standards include networking technologies such as UDP, TCP/IP and Ethernet technologies. In at least some examples, the external system interface 34 includes a network management card (NMC) and a USB interface. In these examples, the external system interface 34 can receive or transmit data using either or both of these conduits.

Figure 2:
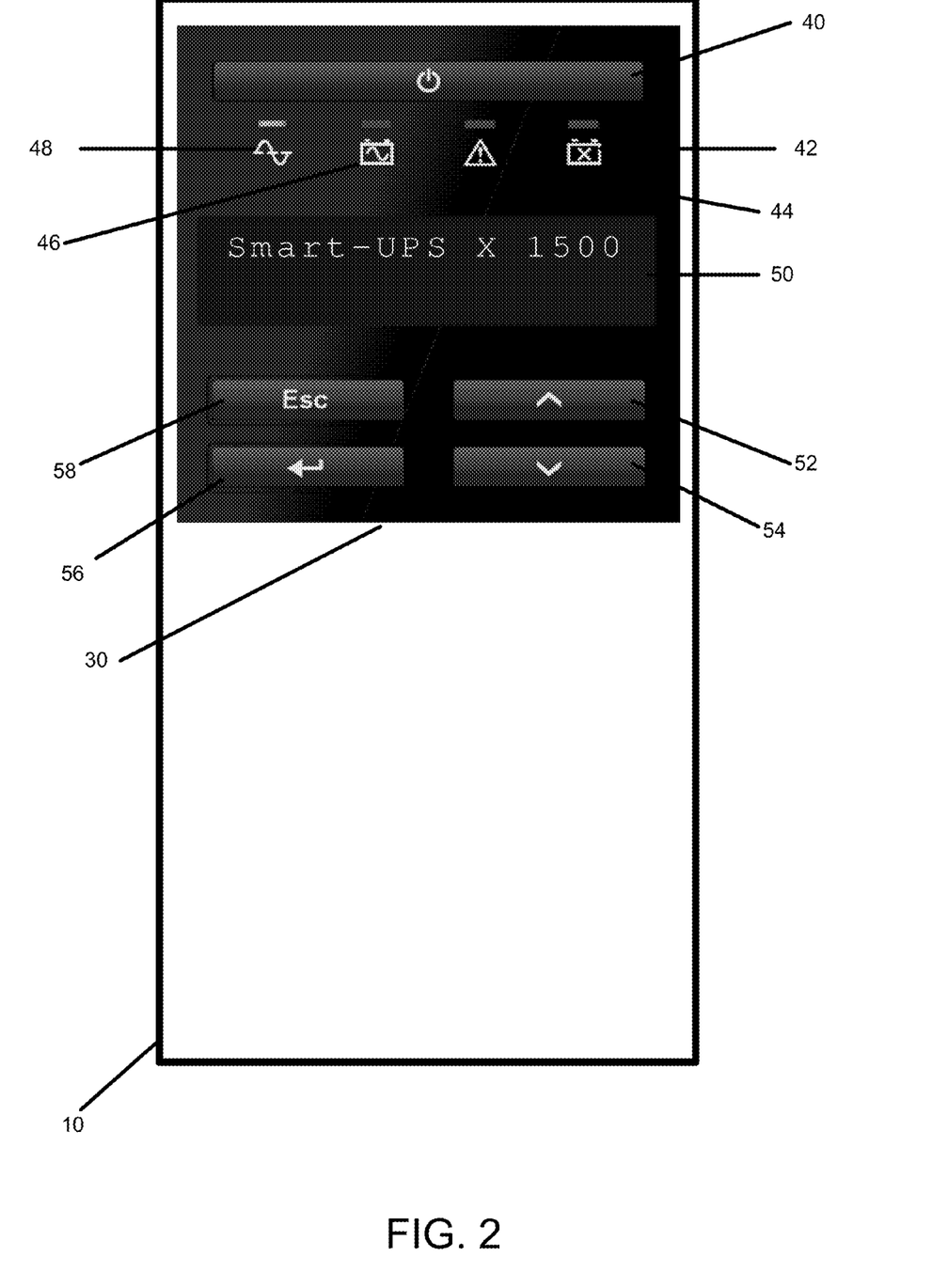
FIG. 2 illustrates an example of a user interface including a display that is housed in a UPS in accordance with the present invention.

The user interface 30 includes a display screen and a set of keys through which a user of the UPS 10 can monitor, control and configure operation of the UPS 10. FIG. 2 depicts an external view of the UPS 10 including the user interface 30. As shown, the user interface 30 includes a power button 40, a replace battery indicator 42, a warning indicator 44, an on-battery power indicator 46, an on-line power indicator 48, an interface display 50, a scroll up button 52, a scroll down button 54, an enter button 56 and an escape button 58.

The user interface 30 functions as follows. The power button 40, when actuated, will cause the UPS 10 to toggle between power-on and power-off states. According to some examples, the UPS 10 performs a series of accompanying actions to better manage these power state transitions.

The set of indicators 42, 44, 46 and 48 provide various information regarding current and prior states of the UPS 10. For example, the UPS 10 may determine, by running a self-test, that the battery 18 needs to be replaced. In this instance, the UPS 10 illuminates the replace battery indicator 42 to communicate this information.

The on-line power indicator 48 and the on-battery power indicator 46 signal the current source of power to the load. An active on-line power indicator 48 signals that the UPS 10 is providing power to the load in a normal operating fashion, i.e. the source of the power is the AC received through the input 24. Conversely, an active on-battery power indicator 46 signals that the source of the power to the load is the battery 18.

In another example, the UPS 10 may determine, for a variety of reasons, that the attention of the user is needed. The reasons may include, among others, detection that the battery 18 is disconnected or that the battery 18 has been depleted by the load. In this case, the UPS 10 signals the need for user attention by activating the warning indicator 44. In addition, the UPS 10 may provide a description of the reason for the warning in the interface display 50.

The interface display 50, which can be fashioned by a variety of hardware components including Liquid Crystal Displays and Light Emitting Diodes, presents a wide variety of information to a user. In one example, the interface display 50 is an alphanumeric display that can display numerical and textual information. This information may include monitoring information, such as the status warnings discussed above. In addition, this information may include configuration information and prompts through which the UPS 10 collects information from the user. Together, the interface display 50 and buttons 52, 54, 56 and 58 provide the UPS 10 with more flexibility in exchanging information with the user than is available using conventional UPS technology.

In one example, UPS 10 includes an interface structure that the user can navigate using the interface display 50 and buttons 52, 54, 56 and 58. This interface structure may include a variety of elements related to one another in various ways. For example, the interface structure may be a hierarchical menu structure. The behavior initiated by actuation of the buttons 52, 54, 56 and 58 is dependent upon the current location of the user in the interface structure, as is the information displayed in the interface display 50.

For example, the current location of the user may be an intermediate location within the interface structure, i.e. the current location connects to other elements of the interface structure. In this situation, the interface display 50 displays one of a list of the other elements of the interface structure connected to the user's current location and the buttons 52, 54, 56 and 58 are configured to provide navigational functions. In this mode, the user can move through, and cause the interface display 50 to display each element of, the list of the elements of the interface structure that are connected to the current location. More precisely, the user can move up the list by actuating the scroll up button 52 and down the list by actuating the scroll down button 54. Furthermore, the user can navigate to the element of the interface structure currently displayed in interface display 50 by actuating the enter button 56. Conversely, the user can navigate to the user's previous location in the interface structure by actuating the escape button 58.

In another example, the current location of the user in the interface structure may cause the UPS 10 to display review information to the user via the interface display 50. This review information may be any information stored within the UPS 10 and may include, among other information, configuration information, operational information and information regarding other devices in communication with the UPS 10, such as devices to which the UPS 10 supplies power. In one example, the interface display 50 displays an element belonging to a list of review information and the buttons 52, 54, 56 and 58 are configured to provide review functions. Under this configuration, the user can move through, and cause the interface display 50 to display each element of, the list of review information. More specifically, and much like the navigational mode discussed above, the user can navigate up or down the list of review information by actuating the scroll up button 52 or the scroll down button 54. Furthermore, the user can navigate to the user's previous location in the interface structure by actuating the escape button 58. In at least some examples, actuation of the enter button 56, while in this mode, results in an error message explaining that the other keys are the valid keys at the user's current location within the interface structure.

According to another example, the current location of the user in the interface structure may cause the UPS 10 to prompt the user for information through the interface display 50. The information prompted for may be any information stored within the UPS 10 and may include, among other information, configuration information, information regarding the source of power into the UPS 10 and information regarding other devices in communication with the UPS 10, such as devices to which the UPS 10 supplies power, i.e. elements of the load. In this instance, the interface display 50 displays a prompt for information and the buttons 52, 54, 56 and 58 are configured to provide data entry functions. In this situation, the user can adjust the information displayed in the interface display 50 and enter responses to the prompts. More specifically, the user can change the response to the prompt using the scroll up button 52 or the scroll down button 54. For example, a user can toggle a Boolean value from true to false or from yes to no by actuating either of buttons 52 or 54. In another example, the user can increase or decrease a numerical answer displayed in the prompt by actuating the scroll up button 52 or the scroll down button 54. In still another example, the user can scroll up or down a list of answers using the scroll up button 52 or the scroll down button 54. In addition, the user can enter the currently displayed response to the prompt by actuating the enter button 56. The user can also exit the prompt without responding to the prompt by actuating the escape key 58. Thus, the particular arrangement and function of the user interface 30 provides users with sundry advantages over conventional UPS interfaces.

The user interface shown in FIG. 2 may be implemented in other examples using different configurations of buttons, different styles of buttons and using display screens of different sizes. In one example, the interface display 50 is a touch screen interface upon which the buttons are rendered for user input. In this example, the sizes, colors and arrangement of the buttons can be altered based on a number of factors including, among others, the level of expertise of the user, the availability of the buttons to accept input and the current status of the UPS. Thus examples in accordance with the present invention allow the user interface 30 to be tailored to the requirements of a variety of users.

Figure 3:
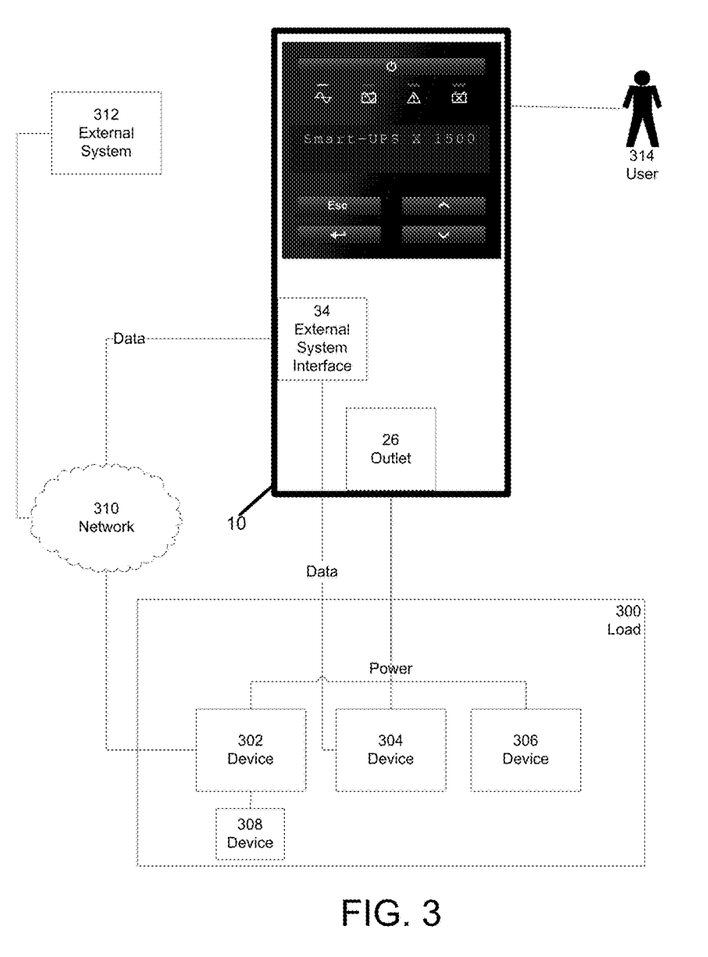
FIG. 3 shows an example of a UPS coupled to a load in accordance with the present invention.

Some examples in accordance with the present invention relate to gathering of system information for the UPS 10 and devices coupled to it. In these examples, the UPS 10 can act as an information hub for itself and the devices coupled to it by receiving and storing system information on the data storage 32 for later retrieval and provision to external entities, such as users or systems. In one example, the UPS 10 provides system information via the user interface 30 or the external system interface 34. FIG. 3 illustrates an example including the UPS 10 configured to function in this manner. As shown, the example of FIG. 3 includes the UPS 10, a load 300, a communications network 310, an external system 312 and a user 314. As discussed above, the UPS 10 includes the outlet 26 and the external system interface 34. The load 300 includes devices 302, 304 and 306, each of which are coupled to, and receive power from, the outlet 26. In addition, device 302 includes a peripheral device 308. As shown, devices 302 and 304 are coupled to, and receive data from, the external system interface 34 of the UPS 10. The network 310 may include any communication network through which computer systems can exchange data. The network 310 may support various methods, protocols and standards including, among others, Ethernet, TCP/IP, and HTTP.

In the example shown, the UPS 10 gathers, stores and provides system information for itself and the elements of the load 300. In this example, the UPS 10 gathers configuration management information for devices 302 and 304 by requesting the configuration management information via the external system interface 34. In response to this request, the devices 302 and 304 provide the requested configuration management information to the UPS 10 via the external system interface 34. In addition, the device 302 provides configuration information regarding the peripheral device 308. The UPS 10 also gathers configuration management information regarding itself and its components, including any installed peripherals. The UPS 10 then stores this configuration management information in the data storage 32 for later use.

In other examples, the devices 302 and 304 provide system information without receiving a request from the UPS 10. In these examples, the devices may provide system information to the UPS 10 upon occurrence of specific events, such as installation and power-up, or at predefined time intervals. Additionally, in these and other examples, the devices 302 and 304 can communicate with the UPS 10 using a variety of communication standards. For instance, in the example shown in FIG. 3, the device 304 communicates with the UPS 10 via a USB interface while the device 302 communicates with the UPS 10 using an Ethernet network connection.

Continuing this example, the UPS 10 gathers power consumption information for the devices 302, 304 and 306 by monitoring the power supplied to the devices via the outlet 26. The UPS 10 may monitor the power individually supplied to each device using a variety of techniques, including monitoring individual outlet groups, individual outlets or individual power phases. The UPS 10 then stores this power consumption information in the data storage 32 for later use.

In one example, the UPS 10 determines configuration management information for devices that are coupled to the UPS 10 via the outlet 26, but that are not able to communicate with the UPS 10 via the external system interface 34. In these examples, the UPS 10 compares power consumption benchmarks that are stored in data storage 32 with the gathered power consumption information pertaining to the device to match the device to one or more potential devices. This technique is described in U.S. patent application Ser. No. 11/766,187, entitled "Method and System for Determining Physical Location of Equipment," filed Jun. 21, 2007, which is hereby incorporated herein by reference in its entirety.

Referring to the example of FIG. 3, the UPS 10 can display the system information in the interface display 50 of the user interface 30 so that the user 314 can review the information. In various examples, the screens and elements used to display the system information are positioned in various locations throughout an interface structure employed by the UPS 10. One such example is detailed in U.S. patent application Ser. No. 12/412,582, entitled "SYSTEM AND METHOD FOR ALTERING A USER INTERFACE OF A POWER DEVICE," filed Mar. 27, 2009, which is hereby incorporated herein by reference in its entirety.

Figure 4:
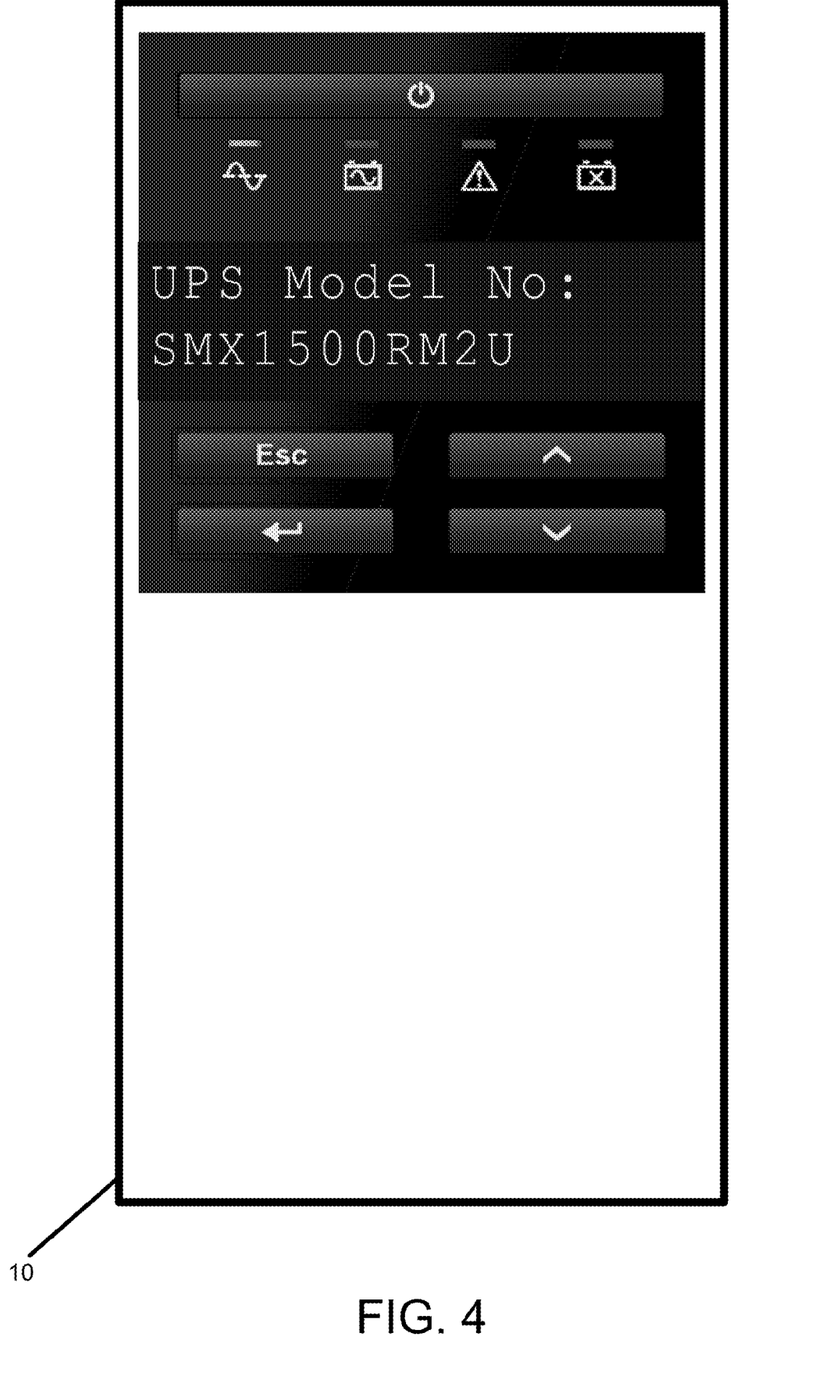
FIG. 4 depicts an example of a UPS displaying system information in accordance with the present invention.

In various examples, the screens used by the UPS 10 to present the system information can be organized into a variety of layouts. FIG. 4 illustrates an example screen displaying system information, in this instance the model number of the UPS 10. Other elements of system information regarding the UPS 10 that are displayed in examples in accordance with the present invention include, among other system information, the efficiency of the UPS 10, the serial number of the UPS 10, the date that the UPS 10 was manufactured, the version of firmware of the UPS 10, the version of the hardware of the UPS 10, the version of the firmware of the interface display 50, the version of the hardware of the interface display 50, results of the latest automatic self test, transfer and fault logs, and values assigned to operational parameters of the UPS 10, such as the current language used by the UPS 10, the input power quality to the UPS 10 and the name of the UPS 10. Examples of system information regarding peripherals of the UPS 10 include, among other information, the date the battery 18 was installed in the UPS 10, the model number of the battery 18, the model number of the NMC, the serial number of the NMC, the version of the NMC hardware, the date the NMC was manufactured, the MAC address of the NMC, the IP address of the NMC, the network settings of the NMC, such as the IP subnet mask and default gateway, the name of the application firmware installed on the NMC, the version of the application firmware installed on the NMC, the name of the operating system installed on the NMC, the version of the operating system installed on the NMC and an indication of external battery packs coupled to the UPS 10. Examples of system information regarding devices coupled to the UPS 10 include, among other information, Watts of real power consumed by the device over a range of time, the name and version of software processes, such as applications, virtual machines and operating systems, that are being executed on the device, the IP address of the device, the type of connection coupling the device to the external system interface 34, and the protocol used to communicate with the device.

Also in the example of FIG. 3, the UPS 10 can transmit the system information to the external system 312 over the network 310 using the external system interface 34. In various examples, the UPS 10 can transmit this information in response to a request for the information. This request can be received from a variety of entities including the user 314, the external system 312 and the device 302. In other examples, the UPS 10 can transmit the system information to the external system 312 without a receiving a request. In these examples, the UPS 10 may transmit the system information on an ad hoc basis, in response to a triggering event that the UPS 10 encounters, or as part of a predetermined schedule.

In another example, the UPS 10 exposes the interface functionality discussed herein through the external system interface 34. In this example, the UPS 10 provides an interface application program interface (API) that includes a set of standards for invoking the interface functionality of the UPS 10. The specific interface functions that may be invoked using the interface API include any interface functionality provide by the UPS 10. Thus, using an external system that is configured to interact with the UPS 10 via the interface API, the user can, for example, shutdown the UPS 10, retrieve or store values for specific operational parameters in the data storage 32, or display information on the interface display 50 or on the external system.

It should be appreciated that even though examples in accordance with the present invention are described herein for use with an on-line UPS, some examples may be used with other UPS topologies including off-line and line interactive UPS's. Further, at least some examples described herein may be used with power devices other than UPS's including, but not limited to, outlet strips, power converters, line conditioners, surge protectors, power conditioners, Power Distribution Units (PDU) and Rack PDUs.

System Information Provision Processes

Figure 5:
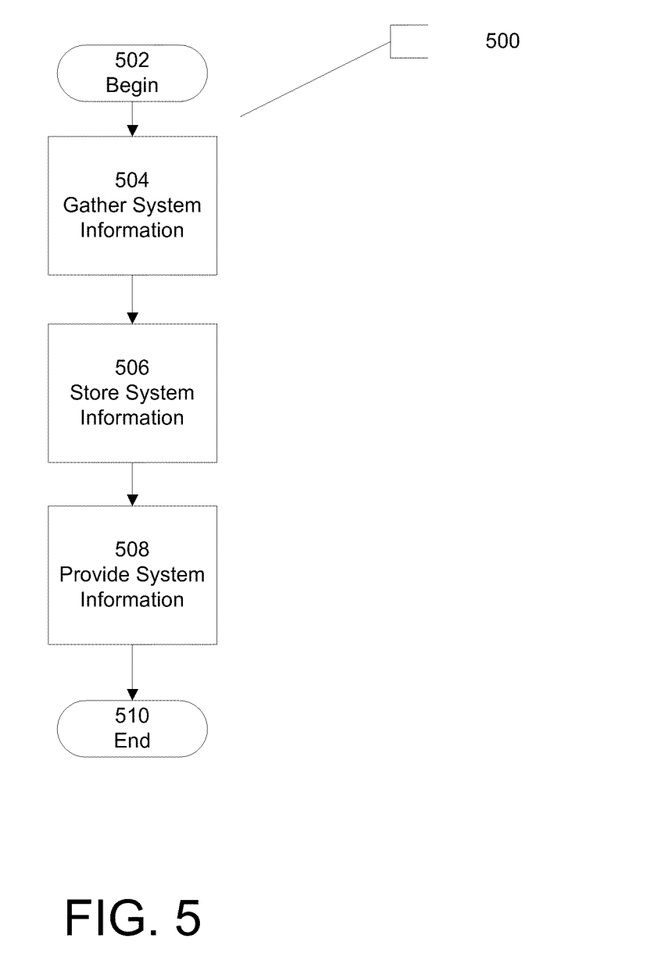
FIG. 5 is a process diagram of a process for gathering, storing and displaying system information in accordance with the present invention.

Various examples in accordance with the present invention include processes for providing system information of a UPS, its peripherals and devices coupled to the UPS via an interface housed within the UPS. FIG. 5 illustrates one such process 500 that includes acts of gathering system information, storing system information and providing system information. Process 500 begins at 502.

In act 504, system information is gathered. According to various examples, a UPS gathers this information from itself, its peripherals and devices coupled to it. Acts in accordance with these examples are discussed below with reference to FIG. 6.

In act 506, the system information is stored. According to a variety of examples, a UPS stores the system information in data storage for later processing. Acts in accordance with these examples are discussed below with reference to FIG. 7.

In act 508, the system information is provided. According to some examples, a UPS provides the system information via an interface. Acts in accordance with these examples are discussed below with reference to FIG. 8.

Process 500 ends at 510. Process 500 enables a UPS to act as a single access point for system information regarding the UPS and devices coupled to it, thus streamlining support procedures for the UPS, its peripherals and attached devices.

Figure 6:
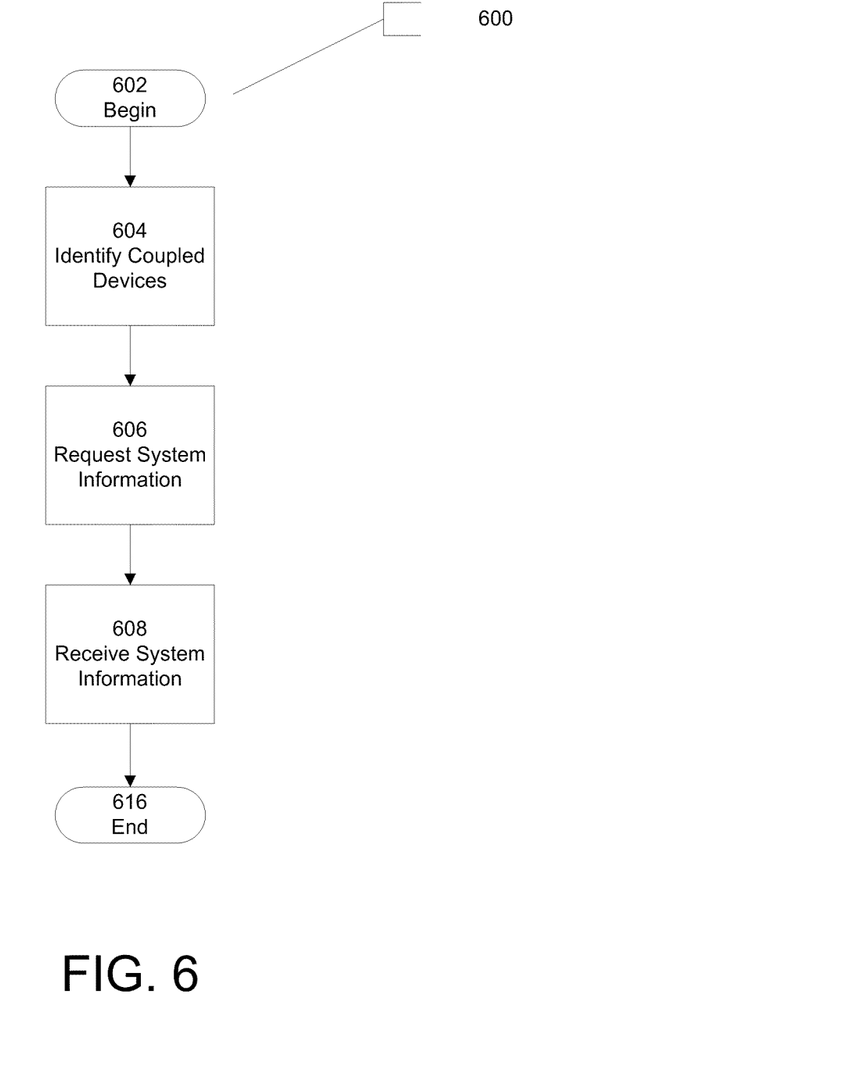
FIG. 6 is a process diagram of a process for gathering system information in accordance with the present invention.

Various examples provide processes for a UPS to gather system information from devices coupled to the UPS. FIG. 6 illustrates one such process 600 that includes acts of identifying coupled devices, requesting system information and receiving system information. Process 600 begins at 602.

In act 604, a UPS identifies devices that are coupled to it. In one example, the UPS that identifies the devices is a UPS arranged and configured in accordance with the UPS 10, as described above. In this example, the UPS 10 identifies devices to which it is coupled using a variety of techniques. In one instance, the UPS 10 monitors data received via the external system interface 34 to detect and identify coupled devices. In another instance, the UPS 10 monitors the power drawn via the outlet 26 to make this determination.

In act 606, the UPS requests system information from identified devices. In one example, the UPS that requests this information is a UPS arranged and configured in accordance with the UPS 10, as described above. In this example, the UPS 10 tailors the request based on the communication standards used by the device and the type of system information the device is capable of communicating. The UPS 10 sends the request via the external system interface 34.

In act 608, the UPS receives the requested system information. In one example, the UPS that receives the system information is a UPS arranged and configured in accordance with the UPS 10, as described above. In this example, the UPS 10 receives the system information via external system interface 34.

Process 600 ends at 610.

Figure 7:
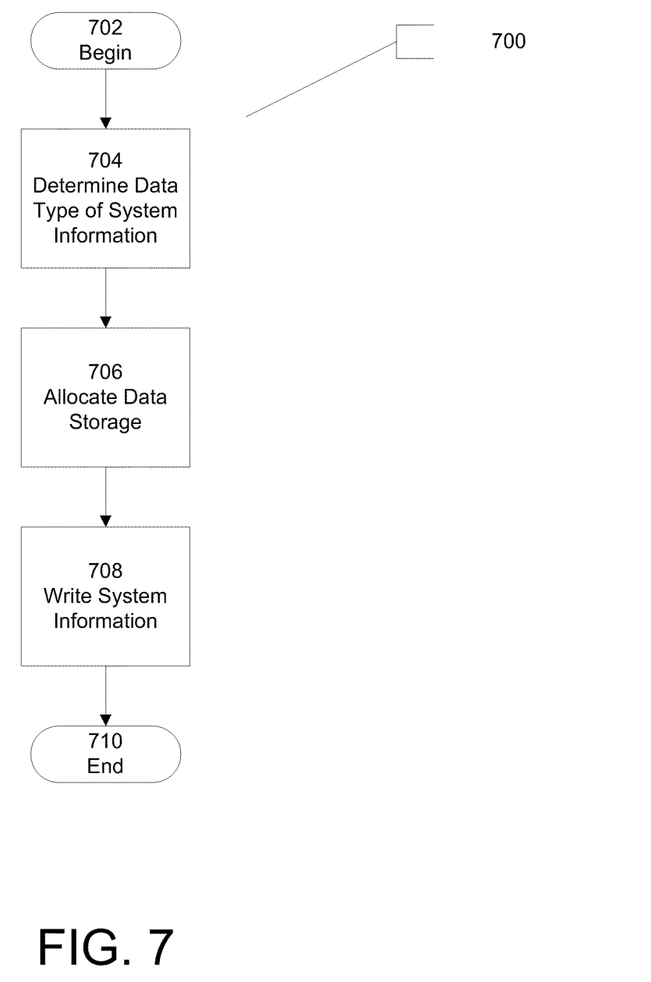
FIG. 7 is a process diagram of a process for storing system information in accordance with the present invention.

Various examples provide processes for a UPS to store system information for devices coupled to the UPS. FIG. 7 illustrates one such process 700 that includes acts of determining the data type of the system information, allocating data storage sufficient to store the system information and writing the system information to the allocated storage. Process 700 begins at 702.

In act 704, a UPS determines the data type, or types, for the system information received from devices coupled to the UPS. In one example, the UPS that determines this data type is a UPS arranged and configured in accordance with the UPS 10, as described above. In this example, the UPS 10 determines the data type of the system information using a variety of methods. In one instance, the UPS 10 determines the data type by inspecting the system information received from the device. In another instance the UPS 10 determines the data type, prior to receiving any system information from the device, based on communications standards used by the device.

In act 706, the UPS allocates data storage for system information received from the devices. In one example, the UPS that allocates the data storage is a UPS arranged and configured in accordance with the UPS 10, as described above. In this example, the UPS 10 allocates space in data storage 32 based on the size required to hold the determined data type or data types of the system information.

In act 708, the UPS writes the system information to the allocated data storage. In one example, the UPS that writes the system information is a UPS arranged and configured in accordance with the UPS 10, as described above. In this example, the UPS 10 writes the system information received from the coupled devices to the allocated space in data storage 32.

Process 700 ends at 710.

Figure 8:
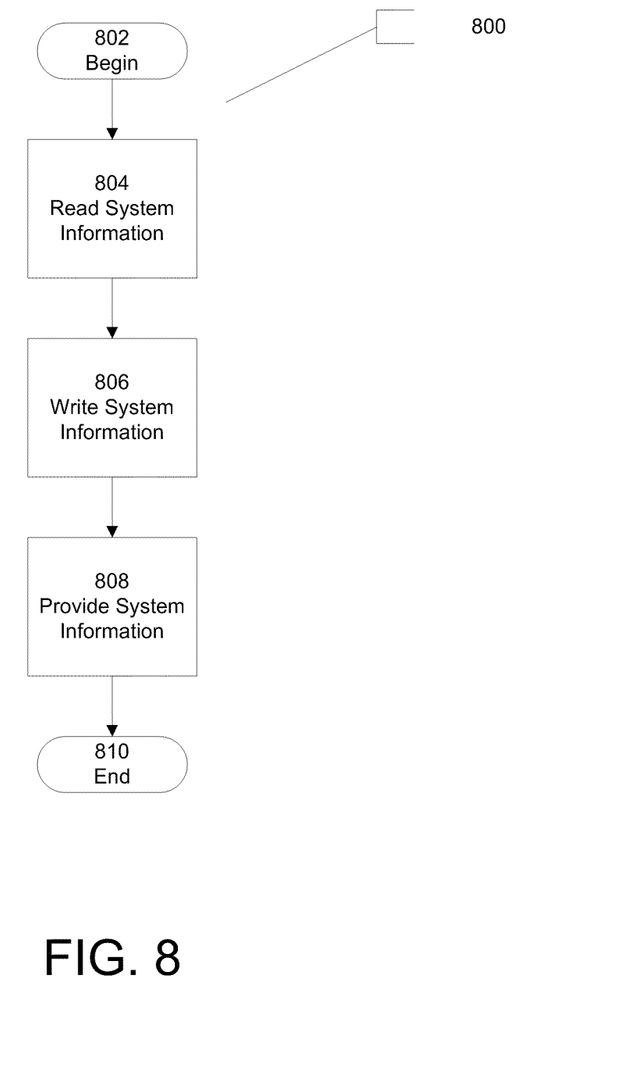
FIG. 8 is a process diagram of a process for displaying system information in accordance with the present invention.

Various examples provide processes for a UPS to provide system information for the UPS and various devices coupled to the UPS. FIG. 8 illustrates one such process 800 that includes acts of reading the system information, writing elements of the system information and providing the elements via an interface of the UPS. Process 800 begins at 802.

In act 804, a UPS reads system information. In one example, the UPS that reads the system information is a UPS arranged and configured in accordance with the UPS 10, as described above. In this example, the UPS 10 reads the system information from data storage associated with the controller 16 such as the memory associated with the controller 16 or the data storage 32.

In act 806, the UPS writes elements of the system information that is to be provided into a memory associated with an interface of the UPS. In one example, the UPS that writes these elements is a UPS arranged and configured in accordance with the UPS 10, as described above. In this example, if the system information is to be provided to a user, the UPS 10 writes these elements into data storage associated with the user interface 30 such as memory associated with the user interface 30 or the data storage 32. Alternatively, if the system information is to be provided to an external system, the UPS 10 writes these elements into data storage associated with the external system interface 34 such as memory associated with the external system interface 34 or the data storage 32.

In act 808, the UPS provides the elements of the system information via an interface housed in the UPS. In one example, the UPS that displays these elements is a UPS arranged and configured in accordance with the UPS 10, as described above. In this example, the UPS 10 displays these elements in the interface display 50 or transmits these elements using the external system interface 34.

Process 800 ends at 810.

Each of process 500, 600, 700 and 800 depicts one particular sequence of acts in a particular example. Some acts are optional and, as such, may be omitted in particular examples in accordance with the present invention. Additionally, the order of acts can be altered, or other acts can be added, without departing from the scope of the present invention. As discussed above, in at least some examples, the acts deal with data representative of tangible objects. In addition, as discussed above, in at least one example, the acts are performed on a particular, specially configured machine, namely a UPS. In other examples, the acts are performed on other particular, specially configured power devices such as, among other power devices, outlet strips, power converters, line conditioners, surge protectors, power conditioners, Power Distribution Units (PDU) and Rack PDUs.

Any reference to examples, elements or acts of the systems, machines and processes herein referred to in the singular may also embrace examples including a plurality of these elements, and any references in plural to any example, element or act herein may also embrace examples including only a single element. References in the singular or plural form are not intended to limit the presently disclosed systems, machines or processes, their components, acts, or elements.

Any example disclosed herein may be combined with any other example, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. Such terms as used herein are not necessarily all referring to the same example. Any example may be combined with any other example in any manner consistent with the aspects disclosed herein. References to "or" may be construed as inclusive so that any terms described using "or" may indicate any of a single, more than one, and all of the described terms.

Where technical features in the drawings, detailed description or any claim are followed by references signs, the reference signs have been included for the sole purpose of increasing the intelligibility of the drawings, detailed description, and claims. Accordingly, neither the reference signs nor their absence are intended to have any limiting effect on the scope of any claim elements.

Having thus described several aspects of at least one example of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method for providing information regarding at least one external load coupled to a power device to receive power from the power device, the power device having nonvolatile data storage and an interface, the method comprising:
    receiving, by the power device from the at least one external load, system information associated with the at least one external load, the system information including configuration management information that identifies one or more components included in the at least one external load;
    storing, in the nonvolatile data storage, the system information associated with the at least one external load; and
    providing at least one portion of the system information via the interface.

2. The method according to claim 1, wherein receiving, by the power device, the system information includes receiving system information via an external system interface.

3. The method according to claim 1, wherein providing the at least one portion of the system information includes transmitting the at least one portion of the system information via an external system interface.

4. The method according to claim 1, wherein providing the at least one portion of the system information includes displaying the at least one portion of the system information in a user interface.

5. The method according to claim 4, wherein displaying the at least one portion of the system information includes displaying the at least one portion of the system information in an alphanumeric display.

6. The method according to claim 1, further comprising gathering performance information associated with the at least one external load.

7. The method according to claim 6, wherein gathering the performance information associated with the at least one external load includes determining power consumption information by monitoring power drawn from a power outlet of the power device and the method further comprises determining configuration management information based in least in part on the power consumption information.

8. The method according to claim 1, further comprising sending a request for the system information to the at least one external load via an external system interface.

9. The method according to claim 1, further comprising providing system information associated with the power device.

10. The method according to claim 1, further comprising providing system information associated with peripherals of the power device.

11. The method according to claim 10, wherein providing the system information associated with peripherals of the power device includes providing information associated with at least one of an external battery and a network management card.

12. The method according to claim 1, wherein receiving, by the power device, the system information includes receiving a name of a software application executing on the at least one external load.

13. The method according to claim 12, wherein receiving, by the power device, the system information includes receiving a version of the software application.

14. The method according to claim 12, wherein receiving, by the power device, the system information includes receiving a version of firmware of a peripheral of the at least one external load.

15. A power device comprising:
a housing;
an input to receive power from a power source;
an output operatively coupled to the input and configured to provide power to at least one external load;
a user interface disposed within the housing;
a nonvolatile data storage disposed within the housing;
a controller coupled to the user interface and the nonvolatile data storage and configured to:
receive, from the at least one external load, system information associated with the at least one external load, the system information including configuration management information that identifies one or more components included in the at least one external load;
store, in the nonvolatile data storage, the system information; and
provide at least one portion of the system information to an external entity.

16. The power device according to claim 15, further comprising an external system interface and wherein the controller is further configured to receive system information via the external system interface.

17. The power device according to claim 15, further comprising an external system interface and wherein the controller configured to provide the at least one portion of the system information to the external entity is further configured to transmit the at least one portion of the system information via the external system interface.

18. The power device according to claim 15, wherein the controller configured to provide the at least one portion of the system information to the external entity is further configured to display the at least one portion of the system information in the user interface.

19. The power device according to claim 18, wherein the user interface includes an alphanumeric display and the controller is configured to display the at least one portion of the system information in the alphanumeric display.

20. The power device according to claim 15, wherein the controller is configured to gather performance information associated with the at least one external load.

21. The power device according to claim 20, wherein the controller is further configured to:
gather power consumption information by monitoring power drawn from the output; and
determine configuration management information based in least in part on the power consumption information.

22. The power device according to claim 15, wherein the controller is configured to send a request for the system information to the at least one external load via an external system interface.

23. The power device according to claim 15, wherein the controller is configured to provide system information associated with the power device.

24. The power device according to claim 15, wherein the controller is configured to provide system information associated with peripherals of the power device.

25. The power device according to claim 24, wherein the controller is configured to provide information associated with at least one of an external battery and a network management card.

26. The power device according to claim 15, wherein the controller is configured to receive configuration management information including a name of a software application executing on the at least one external load.

27. The power device according to claim 26, wherein the controller is configured to receive a version of the software application.

28. The power device according to claim 26, wherein the controller is configured to receive a version of firmware of a peripheral of the at least one external load.

29. A nonvolatile computer readable medium having stored thereon sequences of instruction for providing information regarding at least one external load coupled to a power device to receive power from the power device including instructions that instruct a controller to:
receive, from the at least one external load, system information associated with the at least one external load, the system information including configuration management information that identifies one or more components included in the at least one external load;
store, in nonvolatile data storage, the system information associated with the at least one external load; and
provide at least one portion of the system information via an interface.

30. The computer readable medium according to claim 29, wherein the instructions further instruct the controller to receive configuration management information including a name of a software application executing on the at least one external load.

31. The computer readable medium according to claim 30, wherein the instructions further instruct the controller to receive configuration management information including a version of the software application.

32. The computer readable medium according to claim 30, wherein the instructions further instruct the controller to receive configuration management information including a version of firmware of a peripheral of the at least one external load.

* * * * *